United States Patent
Carroll et al.

(10) Patent No.: US 10,614,431 B2
(45) Date of Patent: Apr. 7, 2020

(54) SYSTEM AND METHOD FOR UPDATING MERCHANT PAYMENT DATA

(71) Applicant: PAYMENTECH, LLC, Dallas, TX (US)

(72) Inventors: Tonya Lin Carroll, Merrimack, NH (US); Chantal Adair Gaspie, Goffstown, NH (US); Gwen Ellen Murray, Merrimack, NH (US); Lakshma Reddy Eapur, Hudson, NH (US)

(73) Assignee: PAYMENTECH, LLC, Dallas, TX (US)

(*) Notice: Subject to any disclaimer, the term of this patent is extended or adjusted under 35 U.S.C. 154(b) by 139 days.

(21) Appl. No.: 15/470,864

(22) Filed: Mar. 27, 2017

(65) Prior Publication Data

US 2017/0200140 A1   Jul. 13, 2017

Related U.S. Application Data (63) Continuation of application No. 13/271,111, filed on Oct. 11, 2011, now Pat. No. 9,607,334, which is a continuation of application No. 10/680,020, filed on Oct. 7, 2003, now Pat. No. 8,036,963.

(51) Int. Cl.
*G07F 19/00* (2006.01)
*G06Q 20/10* (2012.01)
*G06Q 40/00* (2012.01)
*G06Q 40/02* (2012.01)
*G06Q 20/34* (2012.01)

(52) U.S. Cl.
CPC ........... *G06Q 20/10* (2013.01); *G06Q 20/102* (2013.01); *G06Q 20/34* (2013.01); *G06Q 40/00* (2013.01); *G06Q 40/02* (2013.01); *G06Q 40/12* (2013.12)

(58) Field of Classification Search
CPC ....... G06Q 20/10; G06Q 40/12; G06Q 20/102
USPC .......................................................... 705/30
See application file for complete search history.

(56) References Cited

U.S. PATENT DOCUMENTS

| | | | |
|---|---|---|---|
| 5,231,569 A | 7/1993 | Myatt et al. | |
| 5,255,182 A | 10/1993 | Adams | |
| 5,297,202 A | 3/1994 | Kapp et al. | |
| 5,940,813 A * | 8/1999 | Hutchings | G06Q 20/042 705/17 |
| 6,990,471 B1 | 1/2006 | Rajaram | |
| 7,958,049 B2 * | 6/2011 | Jamison | G06Q 20/04 705/35 |
| 8,046,288 B1 * | 10/2011 | LeRoux | G06Q 20/00 705/35 |
| 2002/0032810 A1 | 3/2002 | Wagner | |

(Continued)

OTHER PUBLICATIONS http://web.archive.org/web/20021004051945/www.paymentech.net/abo_cominf_prerel_decdat_page.jsp "Paymentech Introduces Deci$ionable Data, online tool for payment analysis", Aug. 13, 2002.

*Primary Examiner* — Rokib Masud
(74) *Attorney, Agent, or Firm* — Jackson Walker LLP; Christopher J. Rourk (57) ABSTRACT

A system for updating merchant on file payment data at a payment processor is provided. The system includes a merchant processing selection system receiving selection data for one of two or more types of on file payment data update processing. A merchant account update system receives the selection data and processes account update data based on the selection data.

20 Claims, 3 Drawing Sheets

(56) References Cited

U.S. PATENT DOCUMENTS

| | | |
|---|---|---|
| 2002/0072942 A1 | 6/2002 | Kuykendall et al. |
| 2002/0174031 A1 | 11/2002 | Weiss |
| 2003/0093368 A1 | 5/2003 | Manfre et al. |
| 2003/0167231 A1* | 9/2003 | Winking ................ G06Q 20/04 705/40 |
| 2004/0073511 A1 | 4/2004 | Beaumont et al. |
| 2004/0267673 A1* | 12/2004 | Ballard ................ G06Q 20/02 705/77 |
| 2005/0165695 A1 | 7/2005 | Berardi et al. |

* cited by examiner

SYSTEM AND METHOD FOR UPDATING MERCHANT PAYMENT DATA

This non-provisional application is a continuation patent application of U.S. patent application Ser. No. 13/271,111 filed Oct. 11, 2011, now U.S. Pat. No. 9,607,334, which is a continuation of U.S. patent application Ser. No. 10/680,020 filed Oct. 7, 2003, now U.S. Pat. No. 8,036,963, which are hereby incorporated by references.

FIELD OF THE INVENTION

The present invention pertains to the field of payment processing systems, and more particularly to a system and method for updating merchant on file payment data that allows a merchant to get updates to the data prior to the occurrence of a payment event.

BACKGROUND OF THE INVENTION

Account update systems are known in the art. For example, card processors have recently announced that merchants who provide their customers with recurring payment processing for periodic services, such as Internet service providers or toll tag services, can obtain updated account information in response to requests for individual customers, such as when payment data submitted for a customer comes back with an indication that the payment data is incorrect. Additionally, merchants who keep account information "on file" can obtain updated account information. These processes are designed to allow merchants to troubleshoot problems for customers that have enrolled in recurring payment programs or otherwise have their account information on file.

Although such account update services are of value, the processes used by the payment processors require merchants to receive error messages and identify individual records for submission, such as after an error is received. Thus, although such processes allow merchants to take corrective action, they do not prevent the errors from occurring and also require merchants to incur significant administrative costs in handling such situations.

SUMMARY OF THE INVENTION

In accordance with the present invention, a system and method for updating merchant on file payment data are provided that overcome known problems with updating merchant on file payment data.

In particular, a system and method for updating merchant on file payment data at a payment processor are provided that allow merchant on file payment data to be updated before the merchant receives an indication that the on file payment data was not accepted.

In accordance with an exemplary embodiment of the present invention, a system for updating merchant on file payment data at a payment processor is provided. The system includes a merchant processing selection system receiving selection data for one of two or more types of on file payment data update processing. A merchant account update system receives the selection data and processes account update data based on the selection data.

The present invention provides many important technical advantages. One important technical advantage of the present invention is a system and method for updating merchant on file payment data that allows a merchant to receive updated account data prior to submitting a request for payment in an on file payment account, so as to reduce the administrative costs associated with on file payment processes.

Those skilled in the art will further appreciate the advantages and superior features of the invention together with other important aspects thereof on reading the detailed description that follows in conjunction with the drawings.

1. DETAILED DESCRIPTION OF PREFERRED EMBODIMENTS

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

Figure 1:
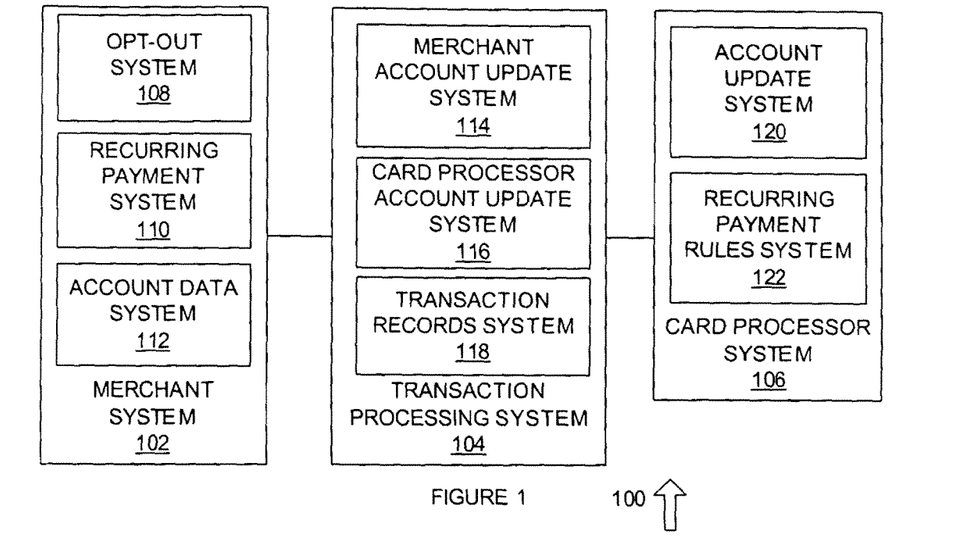
FIG. 1 is a diagram of a system for updating merchant on file payment data at a payment processor in accordance with an exemplary embodiment of the present invention.

FIG. 1 is a diagram of a system 100 for updating merchant on file payment data at a payment processor in accordance with an exemplary embodiment of the present invention. System 100 allows a transaction processing system, such as a credit card payment processor or gateway, to perform merchant update request submissions for account data, so as to obtain updated records and to provide the updated records to a merchant prior to the point in time that a merchant would need to take administrative steps to respond to the failure of an account to be paid through an on file payment program.

System 100 includes exemplary merchant system 102, which can be implemented in hardware, software, or a suitable combination of hardware and software, and which can be one or more software systems operating on a general purpose server platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application. Two or more merchant systems 102 can also be provided.

Merchant system 102 is coupled to transaction processing system 104, which can be implemented in hardware, software, or a suitable combination of hardware and software, and which can be one or more software systems operating on a general purpose server platform. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system. Communications media can be a local area network, a wide area network, a public network such as the Internet, the public switched telephone network, wireless media, fiber optic media, other suitable media, or a suitable combination of such media.

Transaction processing system 104 is coupled to exemplary card processor system 106. Two or more card processor systems 106 can also be provided. Merchant system 102 provides transaction data to transaction processing system 104, such as one or more credit card transactions that can be selected from two or more different card processing systems 106. Transaction processing system 104 receives the account data from merchant system 102, determines the correct card processor system 106 to submit the account data to for validation, submits the account data for validation, receives an indication of whether the account data has been changed or not (such as when a card account is inactive, has been shut down due to fraud, or otherwise changed), and provides the indication of whether a transaction has been authorized or denied to merchant system 102. Transaction processing system 104 also tracks the transaction through reconciliation, such as where a card holder disputes a charge, so that the disputed charge can be tracked and the response from merchant system 102 can be provided to the card holder. Transaction processing system 104 captures account data updates from two or more card processor systems 106, consolidates results and sends updates to merchant system 102.

Merchant system 102 includes opt out system 108, on file payment system 110, and account data system 112, each of which can be implemented in hardware, software, or a suitable combination of hardware and software, and which can be one or more software systems operating on a general purpose server platform. Opt out system 108 allows a card holder to opt out of a recurring payment account updater system or process. In one exemplary embodiment, a card holder may elect to not allow a merchant to receive updated account data, such as account number changes, expiration date changes, address changes, account holder name data, or other changes to an account that can render the data used by a recurring payment system invalid. Opt out system 108 allows card holders to log onto a merchant system 102, transaction processing system 104, card processor system 106, or other suitable systems and to opt out of allowing merchants to obtain account update data, either on an individual merchant basis, on a general basis for all merchants, for a specific card, or in other suitable manners. Opt out system 108 thus allows a card holder to control whether a given merchant will be allowed to obtain update data, such that the card holder can have control over whether a merchant receives account update data.

On file payment system 110 allows a card holder to set up an account on file for payment of services or goods provided through merchant system 102. In one exemplary embodiment, on file payment system 110 can be used with Internet service providers, toll tag service providers, utility service providers, online retailers, catalog retailers, or with other suitable providers of goods or services that perform monthly billing, or other future billings so as to allow the card holder to consolidate bills on a single charge statement. Likewise, on file payment system 110 can allow a card holder to readily opt in or out of the on file payment program on a merchant specific basis, such that the card holder can make decisions for payment of charges based on ability to pay credit card balances, the amount of points awarded in a credit card incentive plan, or based on other factors.

Account data system 112 stores account data for on file payments submitted by merchant system 102. In one exemplary embodiment, account data system 112 can include card holder name data, address data, credit card number data, expiration date data, or other suitable data that is submitted with an on file payment to transaction processing system 104.

Transaction processing system 104 includes merchant account update system 114, card processor account update system 116, and transaction record system 118, each of which can be implemented in hardware, software, or a suitable combination of hardware and software, and which can be one or more software systems operating on a general purpose server platform. Merchant account update system 114 interfaces with merchant system 102 to receive merchant account update records or other suitable data. In one exemplary embodiment, merchant account update system 114 can allow a merchant to select a type of account update process, such as a record extraction process in which records from previous transactions are mined to determine whether they should be submitted to an account updater process of a card processor system, a merchant download process that allows a merchant to extract the on file payment records for submission to a transaction processor system 104, or other suitable processes. Likewise, merchant account update system 114 receives account update data from card processor systems 106 and assembles the account update data to match a merchant format or performs other suitable functions.

Card processor account update system 116 provides account update records to card processor system 106 in accordance with card processor rules, formats, submission processes, or in other suitable manners. Card processor account update system 116 can also receive format, rule, process, or other suitable updates or changes from card processor systems 106 and can implement such updates or changes without the involvement of merchant system 102, so as to make the process of submission of account update requests to card processor systems 106 transparent to merchant systems 102. Likewise, where data needs to be transmitted to merchant system 102, such as requirements on the number of days a merchant has to implement updates before submitting an on file payment on an account to which updates have been applied or other suitable information, card processor account update system 116 can provide such data to merchant system 102 or other suitable systems.

Transaction record system 118 receives transaction data from transaction processing system 104, and stores the transaction data for use in transaction processing, account reconciliation of the transaction settlement, or for other suitable purposes. Transaction record system 118 can be mined using merchant customizable selection criteria, to extract all transactions for submission as on file payments to a card processor system 106, or in other suitable manners.

Card processor system 106 includes account update system 120 and on file payment rules system 122, each of which can be implemented in hardware, software, or a suitable combination of hardware and software, and which can be one or more software systems operating on a general purpose server platform. Account update system 120 provides account update data in response to a query received from transaction processing system 104 for a given account record. In one exemplary embodiment, account update system 120 can include one or more format or rule requirements that are imposed by a card processor system 106, such as the format of a request for account update data, the types of accounts for which account update data can be requested, whether requests for account updates can be submitted based on previously submitted requests, or other suitable data.

On file payment rules system 122 applies one or more predetermined rules to process requests for the update of payment data for on file payment accounts. In one exemplary embodiment, the on file payment rules can include processes for ensuring that on file payments are not provided to certain accounts, for ensuring that card holders that have opted out from account updates for on file payments are not provided with account updates, and for submission of account updates for on file payment accounts.

In operation, system 100 allows merchants with on file payment processes to receive updated account data for their customers that have opted into such on file payment processes, without requiring the merchant system to incur administrative expenses in responding to non-payment of submitted on file payments. System 100 allows a transaction processing system to submit requests for updated data based on participants in on file payment programs, such that any changes can be detected before an on file payment is submitted and results in nonpayment, thus helping to save operators of merchant system 102 from administrative costs associated with responding to such nonpayment data and from having to individually request account update data from card processor system 106. System 100 further allows such processes to be performed with minimal involvement by the merchant, such as by mining merchant transactions that are submitted to card processing systems 106, allows merchants to provide the requested data in a format that allows transaction processing system 104 to convert from the merchant format to card processing system formats, and performs other suitable functions.

Figure 2:
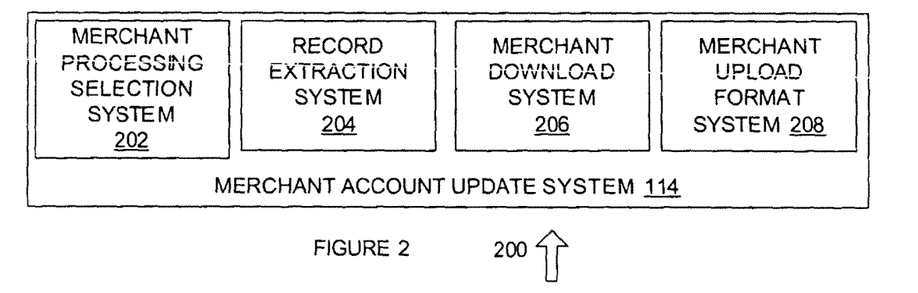
FIG. 2 is a diagram of a system for providing merchant account update functions in accordance with an exemplary embodiment of the present invention.

FIG. 2 is a diagram of a system 200 for providing merchant account update functions in accordance with an exemplary embodiment of the present invention. System 200 includes merchant account update system 114 and merchant processing selection system 202, record extraction system 204, merchant download system 206, and merchant upload format system 208, each of which can be implemented in hardware, software, or a suitable combination of hardware and software, and which can be one or more software systems operating on a general purpose server platform.

Merchant processing selection system 202 receives selection data for two or more types of on file payment data processing and selects the corresponding type of on file payment data update processing in response to the selection data. In one exemplary embodiment, merchant processing selection system 202 can be used when a merchant signs up for on file payment data update processing, such as by querying the merchant operator whether to elect a record extraction process, a merchant download process, to submit their own account update requests, or to select other suitable processes. Merchant processing selection system 202 thus allows merchants to select the level of involvement with the on file payment data update processing, such as in response to paying more for less involvement, or provides other suitable functions. Merchant processing selection system 202 can also track account data for merchants that elect to submit their own account update requests, such as to notify the merchant of rejected transactions that would have been detected if the account update requests were handled for the merchant, to notify the merchant of submitted account update requests that will be rejected due to the failure to comply with one or more card processor system 106 rules or formats, or to otherwise demonstrate to the merchant the benefits of having transaction processing system 104 submit account update requests.

Record extraction system 204 extracts on file payment data update records based on data entered in response to merchant processing selection system 202 or other suitable data. In one exemplary embodiment, record extraction system 204 can receive a period for which to extract payment records for submission to a card processor system 106, such as payments from a predetermined number of days prior to the current day, recurring payments based on payments that have been repeated more than once at an interval specified by each merchant, all records submitted for payment, or other suitable processes. In one exemplary embodiment, record extraction system 204 can allow merchants that deal with primarily recurring payment processes to elect to have all account records for the customers that have elected recurring payments to be submitted to a card processor system 106. Likewise, for merchant systems 102 that have very few on file payment customers, such merchant processors may elect to have record extraction performed only for accounts that have had recurring payments, such as accounts having charges submitted at predetermined dates, two or more charges separated by a predetermined number of days, or in other suitable manners.

Merchant download system 206 receives processing account update records from a merchant system 102, such as where the merchant system 102 has a predetermined file of payment accounts, where a merchant system 102 has a few number of recurring payment accounts and can extract the payment account data readily, or in other suitable manners.

Merchant upload format system 208 receives account update data from card processor systems 106 in response to account update records submitted to each card processor system 106 and converts the account update data into a merchant compatible format. In one exemplary embodiment, merchant upload format system 208 stores merchant record formats for each merchant participating in the merchant account update process for on file payments, each format for merchants based on predetermined merchant processing formats, or other suitable merchant formats, and converts the account update data received from card processor systems 106 to the merchant format based on the known mapping between the card processor system 106 formats and the merchant formats. Likewise, other upload functions can be performed, such as submission of individual records, submission of batch records, direct interfacing with merchant system 102 to perform uploads, or other suitable processes.

In operation, system 200 allows a merchant system 102 to receive on file payment account updates for customers that have elected to have on file payments paid automatically, so as to avoid submission of incorrect account data and the corresponding administrative costs associated with reconciling the declined charges. In one exemplary embodiment, system 200 allows merchants to focus on accounts where charges that have been submitted for payment are declined due to the customer having closed an account, received a new account or gotten a new account expiration date, so as to take administrative acts against such customers to avoid future losses.

Figure 3:
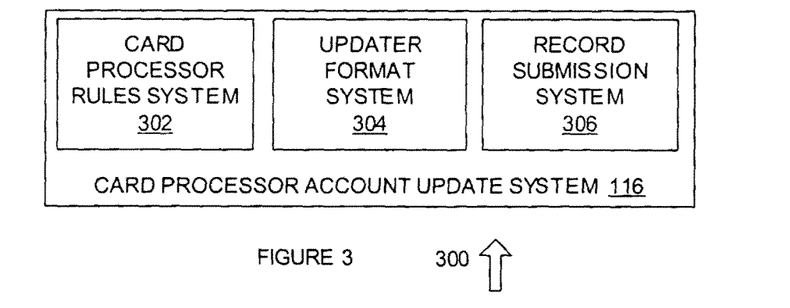
FIG. 3 is a diagram of a system for providing card processor interface capability in accordance with an exemplary embodiment of the present invention.

FIG. 3 is a diagram of a system 300 for providing card processor interface capability in accordance with an exemplary embodiment of the present invention. System 300 allows account update records received from a plurality of merchants to be submitted to different transaction processors in accordance with their individual format requirements, rules, record submission processes, and other suitable requirements or processes.

System 300 includes card processor account update system 116 and card processor rules system 302, updater format system 304, and record submission system 306, each of which can be implemented in hardware, software, or a suitable combination of hardware and software, and which can be one or more software systems operating on a general purpose processing platform. Card processor rules system 302 applies one or more card processor rules to account update data received from merchant system 102 or other suitable account update data. In one exemplary embodiment, card processor rules system 302 receives transaction records from a transaction record system 118 and responds to record extraction processes, receives a batch file of account records from merchant system 102, or otherwise receives records and performs card processor rules processing on such records, such as to ensure that account records are not submitted contrary to card processor rules for submission of records. A card processor can require that certain types of merchant categories not be submitted for account updater processing, such as travel-related arrangements, outbound telemarketing merchant codes, inbound telemarketing for information services via both phone and web merchant codes, betting/lottery/casino merchant codes, or other suitable codes. Card processor rules system 302 can extract account updater records for merchants having such associated merchant codes. Likewise, card processor rules system 302 can extract records for which an update was requested and for which a response was received. For example, if a response of "match made and account closed" has previously been provided in response to an account update request, card processor rules system 302 can extract such records to avoid submission to the card processor and associated penalties, fees, or other problems. Likewise, if a response of "match was previously made and an encrypted account number has been issued such that the issuer has to be contacted for a new encrypted account number," or if a response of "a match has previously been made and the issuer has requested that the merchant contact the card holder," then card processor rules system 302 can extract such records or other suitable records.

Updater format system 304 converts account update records received from merchant system 102 or extracted from transaction record system 118 to the submission record format required by each associated card processor system 106. In one exemplary embodiment, updater format system 304 can convert data fields by adding or deleting unnecessary records, can convert data fields by changing codes from a merchant code to a corresponding card processor system 106 code, or can perform other suitable format changes.

Record submission system 306 submits account update records to card processor systems 106 in accordance with the record submission processes required by each card processor system 106. In one exemplary embodiment, record submission system 306 determines the process required by each card processor, such as the number of records that can be submitted at a time, the sequence for submitting such records, the number of records that can be submitted in a given period, or other suitable submission processes and ensures that requests for account update records are submitted in accordance with such processes. Likewise, record submission system 306 can analyze responses to such records, such as to ensure that the responses are appropriately handled, received at the correct time, received with the correct file number, or otherwise received.

In operation, system 300 allows a transaction processing system to interface with two or more card processor systems 106 to submit account update records received from merchants or extracted from transaction data, so as to obtain account update data for on file payment accounts where a change has been made to a card number, expiration date, or other changes, such that improper denial of charges does not occur and so as to avoid and reduce administrative costs associated with administering on file payment systems that allow payment through card processor systems 106.

Figure 4:
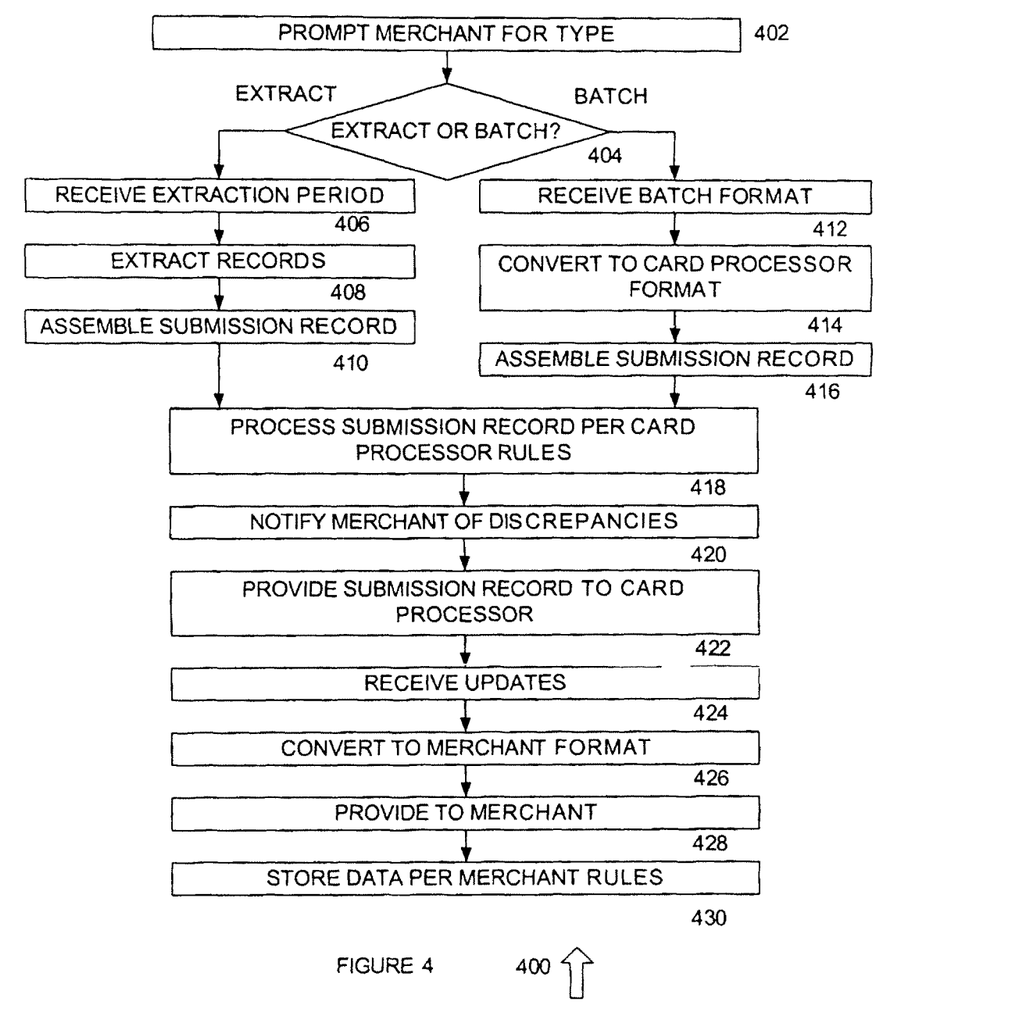
FIG. 4 is a flow chart of a method for providing account updater functions through a transaction processor system in accordance with an exemplary embodiment of the present invention.

FIG. 4 is a flow chart of a method 400 for providing account updater functions through a transaction processor system in accordance with an exemplary embodiment of the present invention. Method 400 begins at 402 where a merchant is prompted to select a type or types of account update processing. In one exemplary embodiment, a merchant can be prompted to respond to an offer for services, can be prompted when signing up for services, or a selection can be made in other suitable manners. The method then proceeds to 404.

At 404, it is determined whether the merchant has selected to have account update records extracted from transactions that have previously been processed for the merchant, to submit a batch file of account records for updating, or both. If it is determined at 404 that an extraction process has been selected the method proceeds to 406 where an extraction period is received. In one exemplary embodiment, a merchant can set the number of days prior to a current date for submission of extraction records, such as where the merchant must implement any update request records within a predetermined time prior to the submission of the next recurring payment charge. For example, if a merchant must update recurring payment data within five days of receipt of the update data from a card processor system 106, then that merchant may request that account records be extracted for charges occurring 24 days prior to each current day, such that any changes within the 24-day period can be detected. In this exemplary embodiment, a change occurring on the $25^{th}$ day would not be detected and would result in the merchant having to incur administrative costs to determine whether the nonpayment was due to insufficient funds or excessive charges to the credit account, or due to a change in the account data that does not reflect the ability of the card holder to pay. The method then proceeds to 408.

At 408, records are extracted based on the selected extraction period, such as by searching through one or more sets of data for the merchant to extract records corresponding with the extraction period. The method then proceeds to 410.

At 410, the submission record is assembled, such as by converting the merchant format to the card processor format. For example, all account update records for a merchant can be assembled by a card processor, and submission record processing can then be performed. Likewise, other suitable processes can be performed. The method then proceeds to 418.

If it is determined at 404 that batch processing is selected the method proceeds to 412 where a batch format submission is received from a merchant, such as a file containing account records for which update processing is requested. The method then proceeds to 414 where the account records are converted to a card processor format, such as by sorting the account update records by card processor type or source and then by applying the card processor format conversions for each card processor. The method then proceeds to 416 where the converted card account update records in each card processor format are assembled for submission to each card processor. The method then proceeds to 418.

At 418, the submission records are processed in accordance with card processor rules. In one exemplary embodiment, card processors can require that account records that have previously been submitted not be resubmitted for certain account update response codes following the previous submission, that account records for certain merchant codes not be submitted for account update processing, or that other suitable rules be implemented. The method then proceeds to 420.

At 420, merchants are notified of any discrepancies with the submitted account update records and the processor rules. In one exemplary embodiment, a merchant may have previously received a response to an account update record request, but may not have implemented the proper changes based on the response. Such merchants can be reminded of the need to implement such changes. Likewise, merchants can be notified if they have submitted account update records having merchant code types or other payment types for which account update processing is not performed or other account update record discrepancies. The method then proceeds to 422.

At 422, the submission record is submitted to the card processors. In one exemplary embodiment, each card processor can receive the submission record according to procedures dictated by such card processors for submission of account update records. The method then proceeds to 424.

At 424, responses to the submission in the form of account updates are received. In one exemplary embodiment, the update data can include one or more codes that define whether the account record can be submitted subsequently for processing, or other suitable data. The update data can also be matched to the submission records. The method then proceeds to 426.

At 426, the account update data is converted to a merchant format, such as a merchant format for submission of account update data into the merchant's account database, a merchant format for receiving data from transaction processing system 104, or other suitable merchant formats. The method then proceeds to 428.

At 428, the converted data is provided to the merchant, such as at predetermined times, in a predetermined sequence, by interfacing directly to the merchant systems, by providing a file to the merchant to be uploaded by the merchant, or in other suitable manners. The method then proceeds to 430.

At 430, data is stored per the merchant rules, such as by storing the data in accordance with merchant processes or formats.

In operation, method 400 allows merchants to obtain account update data for on file payment users. Method 400 allows merchants to avoid administrative costs associated with determining whether an on file payment has been declined due to the inability of the account to be charged, due to a change in the account number, expiration date of the credit card, or other data that does not reflect the ability of the card holder to pay, and thus helps merchants to avoid initiating collection processes for customers that have only changed accounts due lost cards, fraud committed on a card, change of name, change of expiration date, or other similar changes.

Figure 5:
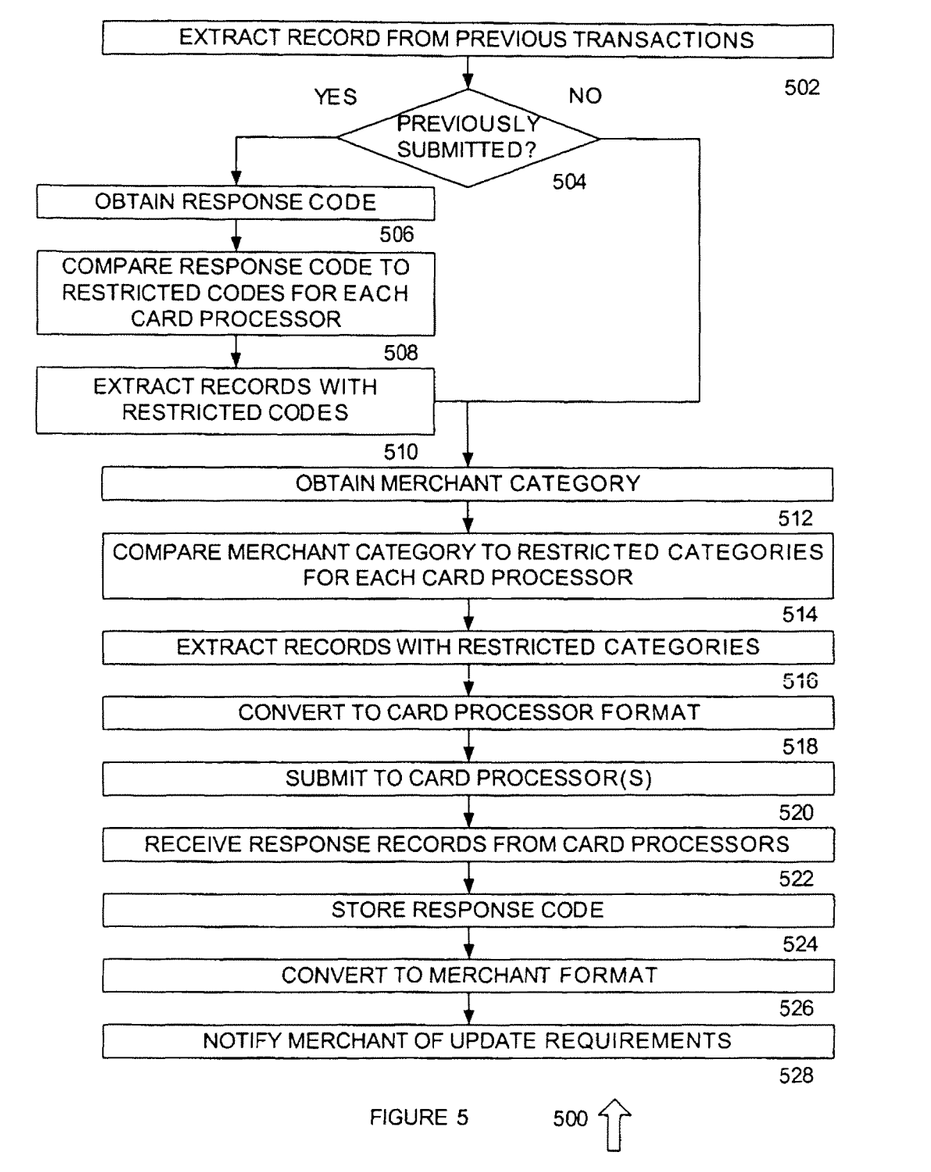
FIG. 5 is a flow chart of a method for submitting records for account updates in accordance with an exemplary embodiment of the present invention.

FIG. 5 is a flow chart of a method 500 for submitting records for account updates in accordance with an exemplary embodiment of the present invention. Method 500 allows card processor rules to be applied prior to submission of a record so as to avoid charges associated with incorrect submissions or other charges.

Method 500 begins at 502 where a record is extracted from a previous transaction. For example, the record can include one or more previous account update transactions, recurring payment transactions, credit or debit transactions, or other suitable transactions. The method then proceeds to 504.

At 504, it is determined whether the account update request has previously been submitted. If it has not previously been submitted the method proceeds to 512. Otherwise the method proceeds to 506 where a response code from the previous submission is obtained from a database or other suitable systems. The method then proceeds to 508.

At 508, the response code is compared to restricted codes for each card processor. In one exemplary embodiment, card processors can require that previously submitted transactions (such as where a match was made and it was determined that the account was closed, where a match was made and it was determined that the account has been encrypted and that the issuer must be directly contacted for a new encrypted account number, or where a match was made and that the issuer had requested that the merchant contact the card holder such as where a card holder has opted out of an account update process) be checked prior to submitting a second request, such as to determine whether such response codes have previously been provided. The method then proceeds to 510.

At 510, records having such restricted codes are extracted from the current submission for the card processing system. In addition, other suitable processes can be performed, such as notifying the merchant of the response to the previous submission. The method then proceeds to 512.

At 512, the merchant category for each record is obtained. The method then proceeds to 514 where the merchant category is compared to restricted categories for each card processor. For example, card processors may not allow account record updating processes to be performed for travel-related merchant codes, outbound telemarketing merchant codes, inbound telemarketing merchant codes for information services via both phone and web, betting/lottery/gaming or casino merchant codes, or other suitable merchant codes. The method then proceeds to 516.

At 516, records with restricted merchant codes or categories are extracted. In one exemplary embodiment, the records can be extracted for each merchant, after a batch of records has been assembled for each card processor, such as including records for one or more merchants, or in other suitable manners. In addition, other suitable processes can be performed, such as notifying the merchant of the response to the submission. The method then proceeds to 518.

At 518, the account update records are converted to a card processor format. Likewise, this process can be performed previous to the prior steps. For example, a merchant can submit account update data or extracted account update records, which can then be converted to a card processor format prior to the extraction of previously-submitted records, records having invalid merchant codes, or other suitable processes. The method then proceeds to 520.

At 520, the account update records are submitted to card processors in accordance with card processor procedures. In one exemplary embodiment, card processors may require records to be submitted individually, in batch form, at predetermined times, in predetermined sequences, or in other suitable manners. The method then proceeds to 522.

At 522, response records are received from card processors. In one exemplary embodiment, response records can be received in batch and can be sorted by merchant code, a record code or in suitable manners. The method then proceeds to 524.

At 524, the response code is stored, such as to allow the response code to be used to filter records for future submissions. The method then proceeds to 526.

At 526, the response code is converted to a merchant format, such as to allow the merchant to receive a file of account update data and to implement the file without additional processes being performed to convert the file into the merchant's submission format. Likewise, other suitable merchant format conversions can be provided. The method then proceeds to 528.

At 528, the merchant is notified of any update requirements, such as changes to merchant codes that are allowed or accepted by a processor, changes to processing times or dates, or other suitable changes that require a merchant to perform additional processes.

In operation, method 500 allows merchants to receive account update data for recurring payment customers by interfacing with a payment processor and obtaining such data from a payment processor. Method 500 thus allows a payment processor to perform administrative work and ensure that compliance with each card processor's internal procedures and formats is obtained for such records.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A system for processing payment transactions, the system comprising:
   a transaction processing system operating on a processor that is configured to receive over a data network a payment transaction request from a merchant and to process the request in response, and to determine from processing the request whether the request is an on file payment transaction, and in response to determining the account data is an on file payment transaction, to determine and select a card processor system from a plurality of card processor systems according to the processed transaction request, and to submit a request for updated account data over another data network prior to receiving an error message indicating that the account data is incorrect; and
   a card processor system operating on another processor and configured to receive the request for updated account data from the transaction processing system and to use the request to determine if updated account data exists, and if it is determined that updated account data exists, further determining if the updated account data can be provided based on account information associated with the on file payment transaction, and if it is determined that updated account data can be provided, to send the updated account data to the transaction processing system over the other data network, and if it is determined that the updated account data cannot be provided, then to send an indicating notification over the other data network.

2. The system for processing payment transactions of claim 1 wherein the payment transaction request includes an indication of an on file payment transaction type, a consumer account and a merchant account.

3. The system for processing payment transactions of claim 2 wherein the transaction processing system is configured to determine the card processor system from the consumer account.

4. The system for processing payment transactions of claim 2 wherein the account update requests includes the transaction type, consumer account, and the merchant account.

5. The system for processing payment transactions of claim 2 wherein the card processor system is configured to use the consumer account and merchant account to determine if updated account data can be provided.

6. The system for processing payment transactions of claim 1 wherein the payment transaction request is a batch file that includes an indication of an on file payment transaction type, a consumer account and a merchant account for each entry.

7. The system for processing payment transactions of claim 1 wherein the transaction processing system is configured to receive the updated account data or the indicating notification and to notify the merchant of the received data or notification.

8. The system for processing payment transactions of claim 1 wherein the transaction processing system is configured to receive the updated account data or the indicating notification and is configured to store the received data or notification.

9. The system for processing payment transactions of claim 1 wherein the transaction processing system is configured to automatically generate a request for updated account data pursuant to the requirements of the selected card processor system and to submit the request.

10. The system for processing payment transactions of claim 1 wherein the transaction processing system is configured to submit a subsequent payment transaction request after receipt of the updated account data.

11. A method of processing payment transactions between a transaction processing system operating on a processor and a card processor system operating on another processor, the method comprising:
   receiving, at the transaction processing system, a payment transaction request from a merchant over a data network;
   processing the payment transaction request to determine if the request is an on file payment transaction and in response to determining the account data is an on file payment transaction determining and selecting a card processor system from a plurality of card processor systems according to the processed transaction request;
   submitting a request for updated account data over another data network;
   receiving, at a card processor system over the other data network, the request for updated account data from the transaction processing system and using the request to determine if updated account data exists and if determined updated account data exists further determining if the updated account data can be provided based on account information associated with the on file payment transaction;

sending the updated account data over the other data network to the transaction processing system if determined updated account data can be provided; and sending an indicating notification to the transaction processing system if determined the updated account data cannot be provided.

12. The method for processing payment transactions of claim 11 wherein the payment transaction request includes an indication of a on file payment transaction type, a consumer account and a merchant account.

13. The method for processing payment transactions of claim 12 wherein the method further includes the step of determining the card processor system from the consumer account.

14. The method for processing payment transactions of claim 12 wherein the account update requests includes the transaction type, consumer account, and the merchant account.

15. The method for processing of payment transactions of claim 12 wherein the method further includes the step of determining if updated account data can be provided based on the consumer account and merchant account.

16. The method for processing of payment transactions of claim 11 wherein the payment transaction request is a batch file that includes an indication of an on file payment transaction type, a consumer account and a merchant account for each entry.

17. The method for processing of payment transactions of claim 11 wherein the method further includes the step of receiving the updated account data or the indicating notification and notifying the merchant of the received data or notification.

18. The method for processing of payment transactions of claim 11 wherein the method further includes the step of receiving the updated account data or the indicating notification and stores the received data or notification.

19. The method for processing of payment transactions of claim 11 wherein the method further includes the step of automatically generating a request for updated account data pursuant to the requirements of the selected card processor system and submits the request.

20. The method for processing of payment transactions of claim 11 wherein the method further includes the step of submitting a subsequent payment transaction request after receipt of the updated account data.

* * * * *